(12) United States Patent
Nagoya (10) Patent No.: US 11,513,379 B2
(45) Date of Patent: Nov. 29, 2022

(54) LIQUID CRYSTAL ELEMENT, PHASE MODULATION DEVICE, AND CONTROL METHOD OF LIQUID CRYSTAL ELEMENT

(71) Applicant: JVCKENWOOD Corporation, Yokohama (JP)

(72) Inventor: Takashi Nagoya, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/502,183

(22) Filed: Oct. 15, 2021

(65) Prior Publication Data

US 2022/0035193 A1 Feb. 3, 2022

Related U.S. Application Data

(60) Division of application No. 17/012,918, filed on Sep. 4, 2020, now Pat. No. 11,187,929, which is a (Continued)

(30) Foreign Application Priority Data

Mar. 12, 2018 (JP) .............................. JP2018-043899

(51) Int. Cl.
*G02F 1/133* (2006.01)
*G02F 1/31* (2006.01)

(52) U.S. Cl.
CPC .......... *G02F 1/13306* (2013.01); *G02F 1/31* (2013.01); *G02F 2201/123* (2013.01); *G02F 2201/58* (2013.01); *G02F 2203/50* (2013.01)

(58) Field of Classification Search
CPC ............. G02F 1/13312; G02F 1/13318; G02F 2203/50; G02F 2201/58; G02F 1/31
See application file for complete search history.

(56) References Cited

U.S. PATENT DOCUMENTS

2015/0325973 A1* 11/2015 Dupret ................. G03H 1/0443
349/1
2017/0316756 A1* 11/2017 Sakurai ............... G02F 1/13306

FOREIGN PATENT DOCUMENTS

| JP | 2007-11163 A | 1/2007 |
|---|---|---|
| JP | 2015-014926 A | 1/2015 |
| JP | 2016-143037 A | 8/2016 |

OTHER PUBLICATIONS

Office Action dated Dec. 14, 2021 issued in corresponding Japanese Application No. 2018-043899.

* cited by examiner

*Primary Examiner* — Jessica M Merlin
(74) *Attorney, Agent, or Firm* — Nath, Goldberg & Meyer; Jerald L. Meyer; Stanley N. Protigal (57) ABSTRACT

A phase modulation device includes an image data generator, a controller, a light reception signal detector, and a liquid crystal element. The image data generator generates image data. The controller generates a gradation control signal based on the image data. The liquid crystal element includes a first substrate and a light receiver. The first substrate has a pixel region in which a plurality of pixel electrodes constituting pixels are arranged. The light receiver photoelectrically converts light with which the pixel region is irradiated to generate a light reception signal. The light reception signal detector generates a drive control signal based on the light reception signal. The liquid crystal element changes an inclination angle of a wavefront of the light with which the pixel region is irradiated by applying different driving voltages to the plurality of pixel electrodes based on the gradation control signal.

1 Claim, 6 Drawing Sheets

Related U.S. Application Data continuation of application No. PCT/JP2018/042088, filed on Nov. 14, 2018.

LIQUID CRYSTAL ELEMENT, PHASE MODULATION DEVICE, AND CONTROL METHOD OF LIQUID CRYSTAL ELEMENT

CROSS REFERENCE TO RELATED APPLICATION

This is a Divisional Application of U.S. patent application Ser. No. 17/012,918, filed Sep. 4, 2020, an application claiming benefit of International Application No. PCT/JP2018/042088 filed Nov. 14, 2018 and claiming benefit from Japanese Application No. 2018-043899, filed Mar. 12, 2018, the content of each of which is hereby incorporated by reference in its entirety.

BACKGROUND

The present disclosure relates to a liquid crystal element, a phase modulation device, and a control method of the liquid crystal element.

In recent years, in an optical communication field, an optical network system formed in an annular shape and an optical wavelength division multiplexing communication system have been proposed in order to cope with a rapidly increasing amount of information. A reconfigurable optical add-drop multiplexer (ROADM) device that can perform branching or insertion of an optical signal in these optical communication systems without relaying conversion to an electrical signal is used.

As an optical switching device in the ROADM device, a wavelength selective switch (WSS) device is used. As an optical switching element in the WSS device, a micro electro mechanical systems (MEMS) mirror and a reflection type liquid crystal element, for example, a liquid crystal on silicon (LCOS) element or the like are used.

The LCOS element is a reflection type liquid crystal element having a pixel region in which a plurality of reflection type pixel electrodes are arranged in the horizontal direction and the vertical direction. A refractive index of a liquid crystal on each pixel electrode changes by controlling a voltage applied to the liquid crystal for each pixel electrode. The phase velocity of the signal light is controlled for each pixel by changing the refractive index of the liquid crystal on each pixel.

The LCOS element can change (incline) a wavefront of the signal light by changing the phase velocity stepwise for each pixel. The LCOS element can control an inclination angle of the wavefront of the signal light according to a rate of change of the phase velocity. That is, the LCOS element functions as a phase modulation element that reflects the signal light in a predetermined direction by changing the phase velocity for each pixel.

The MEMS mirrors are required corresponding to the number of bands of wavelength of the signal light. For that reason, when the band of wavelength of signal light or the number thereof is changed, the MEMS mirror has to be newly manufactured in accordance with the changed contents.

In contrast, the LCOS element can arbitrarily divide the pixel region into a plurality of pixel blocks and can control each pixel block. Therefore, when the band of wavelength of signal light or the number thereof is changed, the pixel block can be reconfigured in accordance with the changed contents, and thus it is not necessary to newly manufacture a liquid crystal element. That is, the LCOS element is superior in variable grid property than the MEMS mirror. In Japanese Unexamined Patent Application Publication No. 2016-143037, an example of the phase modulation device using the LCOS element is described.

SUMMARY

When the LCOS element is used as an optical switching element in the WSS device, the LCOS element typically maintains the same image pattern for a long time during optical signal processing, but may be in a no-signal state for a long time. Continuous driving of the LCOS element in the no-signal state is a factor that increases power consumption.

A first aspect of one or more embodiments provides a liquid crystal element including: a first substrate that includes a pixel region in which a plurality of pixel electrodes are arranged and one pixel electrode constitutes one pixel; a second substrate that includes a counter electrode facing the plurality of pixel electrodes and is arranged with a predetermined gap from the first substrate; liquid crystals filled in the predetermined gap; and a light receiver that is arranged in the vicinity of the pixel region on the first substrate, and configured to photoelectrically convert light with which the pixel region is irradiated to generate a light reception signal, wherein a wavefront of the light with which the pixel region is irradiated is changed by applying different driving voltages to the plurality of pixel electrodes based on a gradation control signal including gradation data corresponding to each pixel.

A second aspect of one or more embodiments provides a phase modulation device including: an image data generator configured to generate image data corresponding to a distribution of phase change amount or a distribution of phase velocity based on information data; a controller configured to generate a gradation control signal based on the image data; and a liquid crystal element that is controlled by the gradation control signal, wherein the liquid crystal element includes: a first substrate that includes a pixel region in which a plurality of pixel electrodes are arranged and one pixel electrode constitutes one pixel; a second substrate that includes a counter electrode facing the plurality of pixel electrodes and is arranged with a predetermined gap from the first substrate; liquid crystals filled in the predetermined gap; and a light receiver that is arranged in the vicinity of the pixel region on the first substrate and photoelectrically converts light with which the pixel region is irradiated to generate a light reception signal, a wavefront of the light with which the pixel region is irradiated is changed by applying different driving voltages to the plurality of pixel electrodes based on a gradation control signal including gradation data corresponding to each pixel, the phase modulation device further includes a light reception signal detector configured to generate a drive control signal for switching a driving state of the liquid crystal element from normal operation to a standby state or switching from the standby state to the normal operation, based on the light reception signal, and the controller controls the liquid crystal element to switch the driving state of the liquid crystal element from the normal operation to the standby state, or to switch from the standby state to the normal operation, based on the drive control signal.

A third aspect of one or more embodiments provides a control method of a liquid crystal element, the method including: generating a light reception signal by photoelectrically converting light with which a pixel region, in which a plurality of pixel electrodes are arranged, one pixel electrode constitutes one pixel, and different driving voltages are applied to the plurality of pixel electrodes based on a gradation control signal including gradation data corresponding to each pixel, is irradiated; determining whether or not a signal level of the light reception signal is equal to or higher than a threshold voltage; when it is determined that the signal level of the light reception signal is not equal to or higher than the threshold voltage, determining whether or not a predetermined time or more has elapsed in the state that is not equal to or higher than the threshold voltage; and when it is determined that the predetermined time or more has elapsed, switching a driving state of the liquid crystal element from normal operation to a standby state.

DETAILED DESCRIPTION

A phase modulation device according to one or more embodiments will be described with reference to FIG. 1. A phase modulation device 1 includes an image data generator 2, a controller 3, a light reception signal detector 4, and a reflection type liquid crystal element 5. In the liquid crystal element 5, a light receiver 6 is formed. The image data generator 2, the controller 3, and the light reception signal detector 4 may be configured as an integrated circuit. A voltage monitoring circuit such as a watchdog circuit may be used as the light reception signal detector 4. The liquid crystal element 5 is an LCOS element, for example. Hereinafter, the liquid crystal element 5 is referred to as an LCOS element 5.

Information data JD is input to the image data generator 2. The information data JD includes a parameter indicating a relationship between positions of an input port and an output port of signal light and an angle of reflected light with respect to incident light in the signal light, and a parameter related to a distribution of phase change amount that realizes a band of wavelength of the signal light, that is, a desired reflected light angle.

The phase change amount is advance or delay of a phase of reflected light with respect to a phase of incident light, and corresponds to the distribution of phase velocity. The signal light emitted from a predetermined input port is phase-modulated by the phase modulation device 1 and is made incident on a target output port.

The image data generator 2 sets the distribution of the phase change amount based on the information data JD. The image data generator 2 generates image data DD based on the distribution of the phase change amount or the distribution of the phase velocity, and outputs the image data DD to the controller 3.

The controller 3 generates, based on the image data DD, a gradation control signal GCS including timing for controlling the driving of the LCOS element 5 and gradation data corresponding to each pixel in the LCOS element 5 of the image data DD. The controller 3 outputs the gradation control signal GCS to the LCOS element 5 in accordance with the timing to be written to each pixel. The controller 3 controls the driving of the LCOS element 5 by the gradation control signal GCS.

The light receiver 6 photoelectrically converts the irradiated light to generate a light reception signal LRS. The light receiver 6 outputs the light reception signal LRS to the light reception signal detector 4. The light reception signal detector 4 always monitors the light reception signal LRS. The light reception signal detector 4 detects a signal level of the light reception signal LRS.

Based on the signal level of the light reception signal LRS and the elapsed time thereof, the light reception signal detector 4 generates a drive control signal SCS1 for switching the driving of the LCOS element 5 from a normal operation to a standby state, or a drive control signal SCS2 for switching the driving of the LCOS element 5 from the standby state to the normal operation, and outputs the drive control signal SCS1 or SCS2 to the controller 3.

The controller 3 generates a drive control signal SCS3 for switching the driving of the LCOS element 5 from the normal operation to the standby state based on the drive control signal SCS1 and outputs the drive control signal SCS3 to the LCOS element 5. The controller 3 switches the LCOS element 5 from the normal operation to the standby state by the drive control signal SCS3.

The controller 3 outputs the gradation control signal GCS instead of the drive control signal SCS3 to the LCOS element 5, based on the drive control signal SCS2. As a result, the LCOS element 5 is switched from the standby state to the normal operation. A specific control method of the liquid crystal element 5 will be described later.

Figure 2:
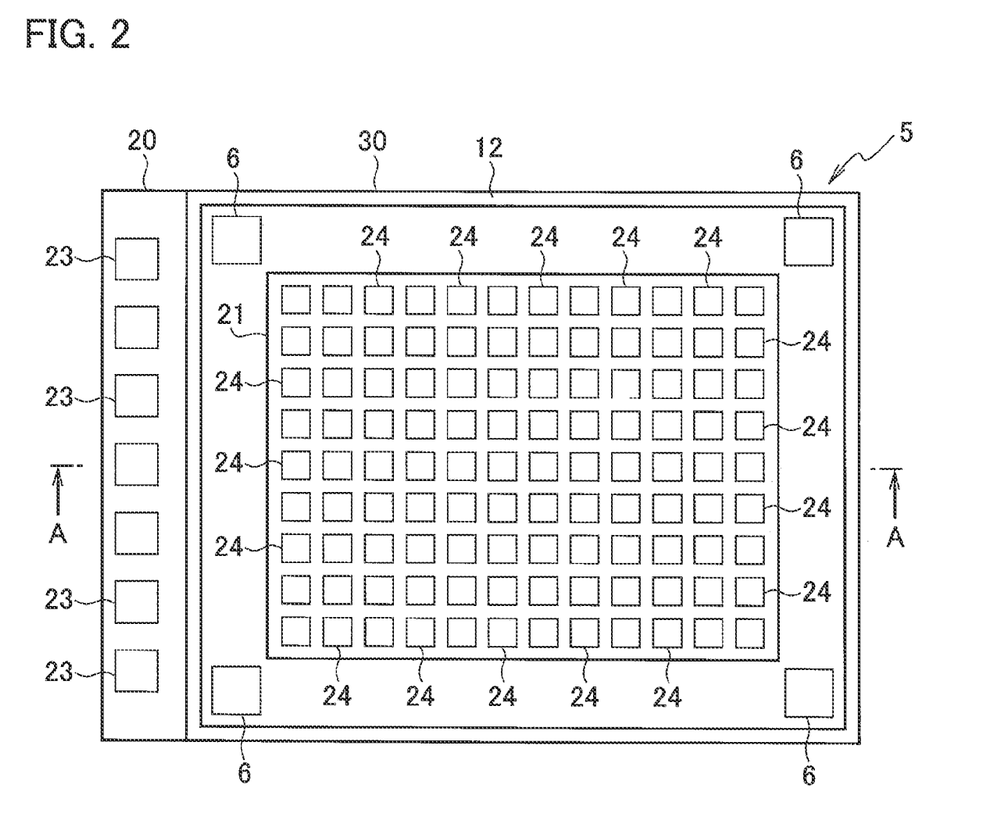
FIG. 2 is a top view illustrating an example of a liquid crystal element.
Figure 3:
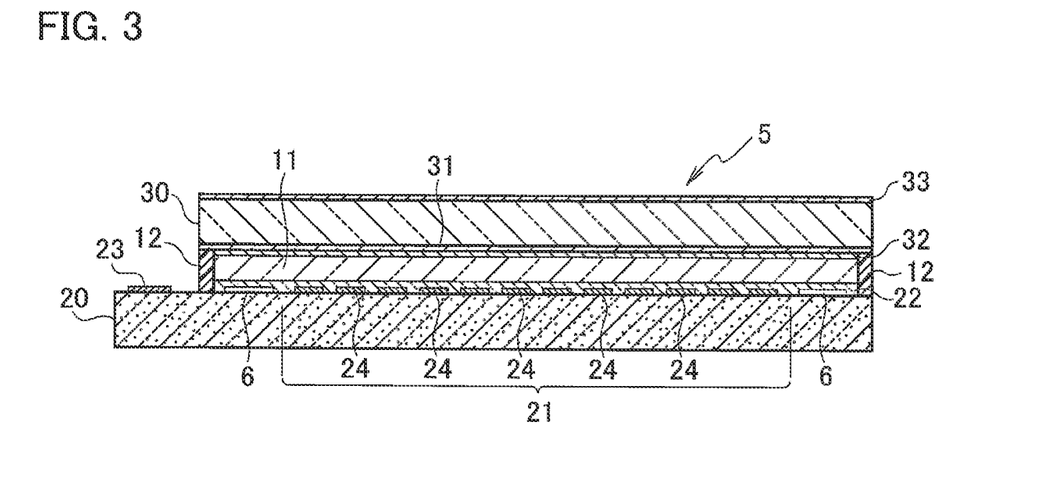
FIG. 3 is a cross-sectional view of the liquid crystal element taken along line A-A in FIG. 2.

A configuration example of the LCOS element 5 will be described with reference to FIGS. 2 and 3. As illustrated in FIG. 2 or 3, the LCOS element 5 includes a driving substrate 20 (first substrate), a transparent substrate 30 (second substrate), liquid crystals 11, a sealing material 12, and the light receiver 6.

The driving substrate 20 includes a pixel region 21, an alignment film 22, and a plurality of connection terminals 23. In the pixel region 21, a plurality of pixel electrodes 24 having light reflectivity are arranged in the horizontal direction and the vertical direction. One pixel electrode 24 constitutes one pixel. The alignment film 22 is formed on at least the pixel region 21.

A semiconductor substrate may be used as the driving substrate 20. The driving substrate 20 is a silicon substrate, for example. A driving circuit for driving each pixel is formed on the driving substrate 20. Aluminum or an aluminum alloy may be used as a material for the pixel electrode 24 and the connection terminal 23.

The light receiver 6 is formed around the pixel region 21 on the driving substrate 20 of the LCOS element 5. Specifically, the light receiver 6 is formed in a region outside the pixel region 21 and in a region in the vicinity of the pixel region 21. The region in the vicinity of the pixel region 21 is a region where the light receiver 6 can receive light with which the pixel region 21 is irradiated. The light receiver 6 receives light (for example, signal light) with which the pixel region 21 is irradiated, and photoelectrically converts the light to generate the light reception signal LRS.

The light receiver 6 is a photodiode, for example. In FIG. 2, a configuration when four light receivers 6 are formed in regions outside the corners of the pixel region 21 is illustrated. The shape and the number of the light receivers 6 are not limited to the configuration illustrated in FIG. 2, and can be set to any shape and number. Further, the position of the light receiver 6 is not limited to the position illustrated in FIG. 2, and can be formed at any position other than the corner as long as it is a region outside the pixel region 21.

A band of wavelength of light used in an optical switching device such as the WSS device is typically an infrared band in the range from 1200 nm to 1700 nm. For example, bands of wavelength called C band and L band are an infrared band in the range from 1530 nm to 1625 nm. A compound semiconductor such as indium gallium arsenide (InGaAs) may be used as a material of a photodiode used as the light receiver 6 having light reception sensitivity in the infrared band.

By a semiconductor process, a buffer layer such as a silicon oxide film or a germanium layer is formed on the driving substrate 20 which is a silicon substrate, for example. Next, a compound semiconductor film such as InGaAs having light reception sensitivity in the infrared band is formed on the buffer layer with the pn junction or the np junction. Furthermore, the formed compound semiconductor film is patterned by photolithography. The light receiver 6 can be formed on the driving substrate 20 by the above-described semiconductor process.

The transparent substrate 30 includes a counter electrode 31 and an alignment film 32. The alignment film 32 is formed on the counter electrode 31. The driving substrate 20 and the transparent substrate 30 are fixed with a predetermined gap by the sealing material 12 so that the plurality of pixel electrodes 24 and the counter electrode 31 face each other.

The transparent substrate 30, the counter electrode 31, and the alignment film 32 have light transmissivity. As the transparent substrate 30, an alkali-free glass substrate or a quartz glass substrate may be used. An indium tin oxide (ITO) may be used as a material of the counter electrode 31. A dielectric film having light transmissivity may be formed on the upper and lower sides of the ITO film.

The sealing material 12 is formed in an annular shape so as to surround the pixel region 21 and the light receiver 6 along the outer periphery of the pixel region 21. As the sealing material 12, an ultraviolet curable resin, thermosetting resin, or resin curable by a combination of ultraviolet rays and heat may be used.

The liquid crystals 11 are filled in a predetermined gap between the driving substrate 20 and the transparent substrate 30, and are sealed with the sealing material 12. An anti-reflection film 33 may be formed on the surface of the transparent substrate 30 opposite to the surface on which the counter electrode 31 is formed. As the anti-reflection film 33, a dielectric multilayer film may be used.

The plurality of connection terminals 23 are formed on the outer periphery of the driving substrate 20. The drive control signal SCS3 and the gradation control signal GCS are input from the controller 3 to a predetermined connection terminal 23 among the plurality of connection terminals 23. The light reception signal LRS generated by the light receiver 6 is output from the predetermined connection terminal 23 among the plurality of connection terminals 23 to the light reception signal detector 4. The predetermined connection terminal 23 among the plurality of connection terminals 23 is connected to an external power source or the like.

Phase modulation of the signal light by the LCOS element 5 will be described with reference to FIGS. 4, 5A, and 5B. Reference numeral 25 indicated in FIG. 4 indicates a pixel block including a plurality of pixel electrodes 24. Usually, the pixel block has a configuration in which three or more pixel electrodes 24 are arranged in the horizontal direction and the vertical direction, respectively.

In order to make the description easy to understand, a case where the pixel block 25 is constituted by three pixel electrodes 24 will be described. In order to distinguish each pixel electrode 24, a pixel electrode 24a, a pixel electrode 24b, and a pixel electrode 24c are set from the left.

Figure 1:
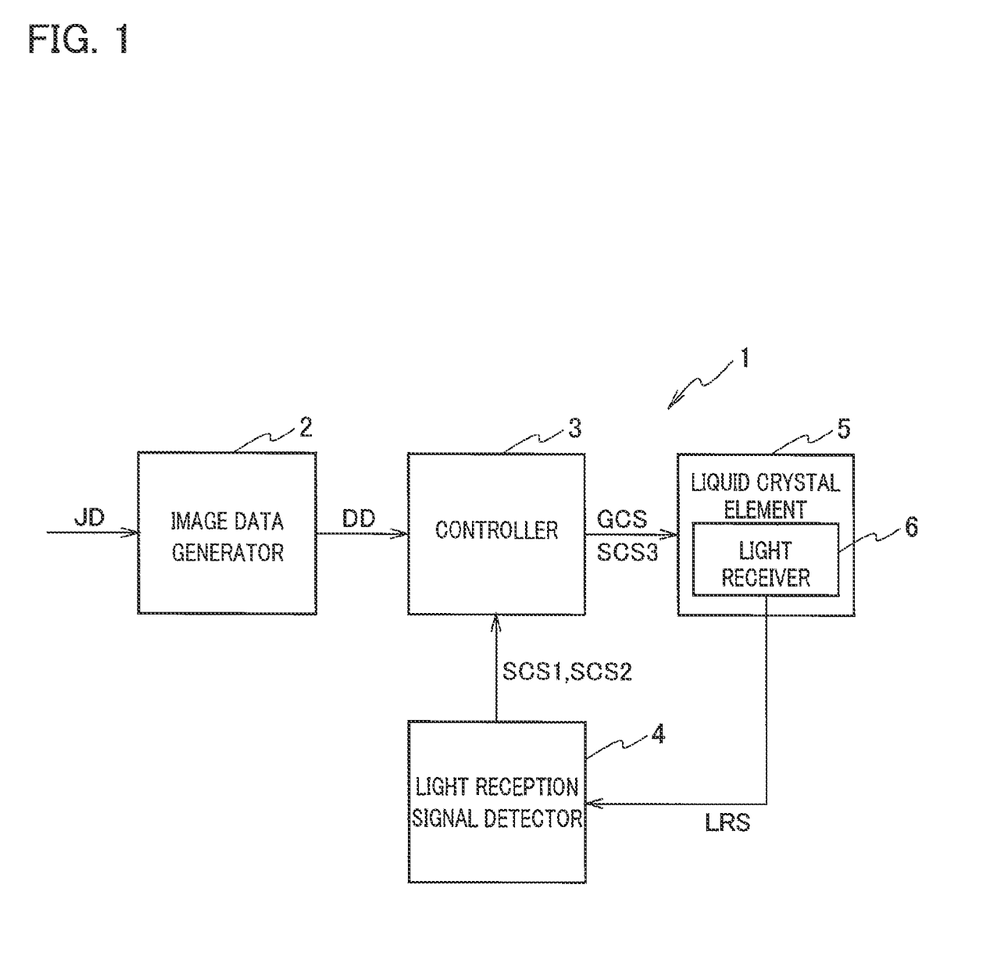
FIG. 1 is a block diagram illustrating a phase modulation device according to one or more embodiments.
Figure 5A:
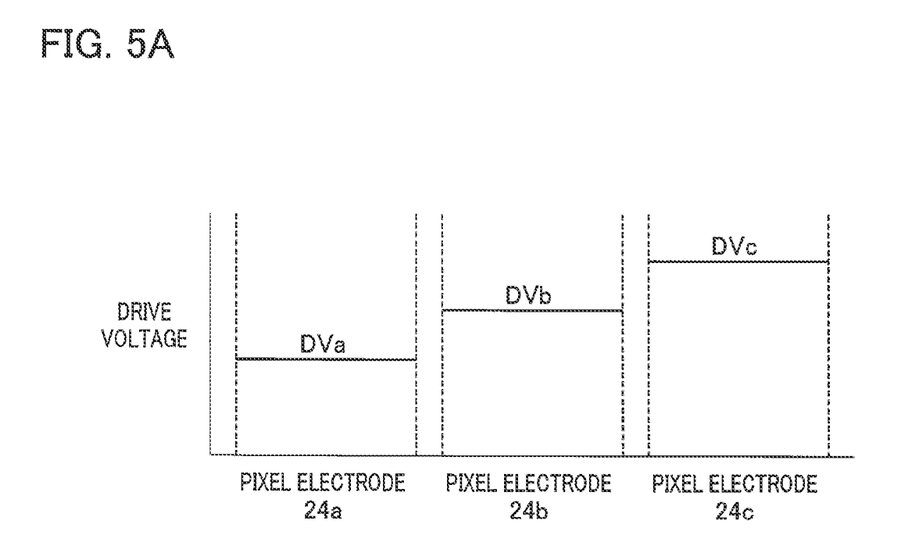
FIG. 5A is a diagram illustrating a driving voltage applied to a pixel electrode.

Based on the image data DD corresponding to the distribution of phase change amount (distribution of phase velocity) generated by the image data generator 2 illustrated in FIG. 1, different driving voltages DVa, DVb, and DVc are applied to the pixel electrodes 24a, 24b, and 24c as illustrated in FIG. 5A.

In practice, the driving voltages DVa, DVb, and DVc applied to the liquid crystals 11 are voltages applied between the pixel electrodes 24a, 24b, 24c, and the counter electrode 31. Since the liquid crystals 11 have anisotropy in the refractive index and dielectric constant of constituent molecules, the refractive index thereof changes, as the inclination of the molecules changes depending on the applied driving voltage.

Figure 5B:
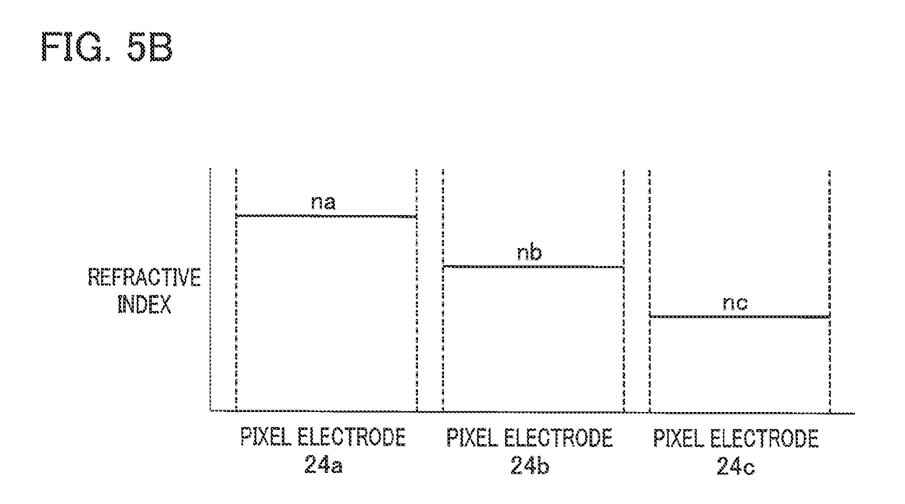
FIG. 5B is a diagram illustrating a refractive index of a liquid crystal on the pixel electrode.

Therefore, as illustrated in FIG. 5B, the liquid crystals 11 on the pixel electrode 24a have a first refractive index na, the liquid crystals 11 on the pixel electrode 24b have a second refractive index nb, and the liquid crystals 11 on the electrode 24c have a third refractive index nc (na>nb>nc). The refractive indexes na to nc are average refractive indexes of the liquid crystals 11 on the pixel electrodes 24a to 24c.

Figure 4:
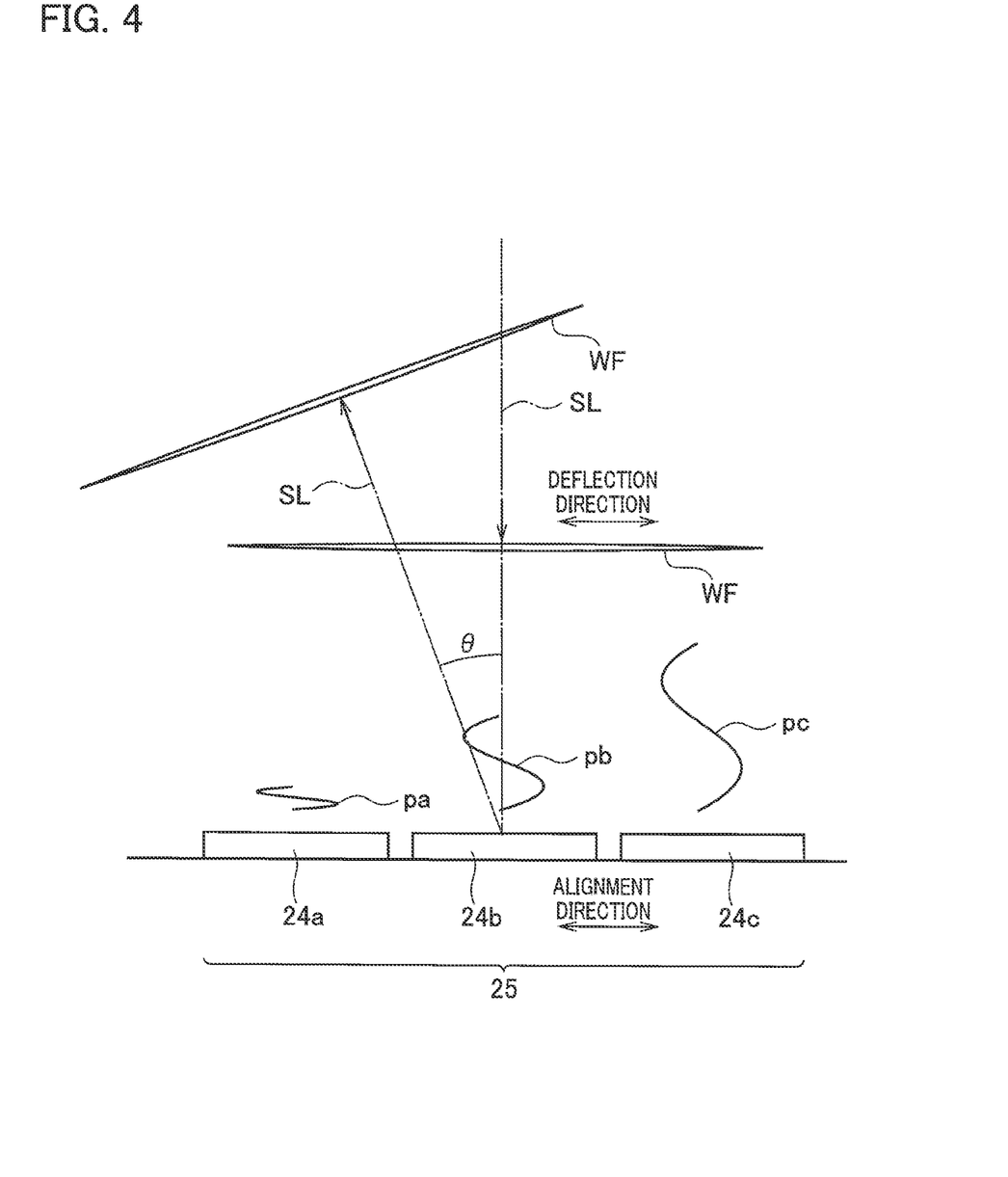
FIG. 4 is a diagram illustrating phase modulation of the signal light by a reflection type liquid crystal element.

As illustrated in FIG. 4, signal light SL output from the input port is incident on the pixel block 25 of the pixel region 21 in a state of linearly polarized light of p-polarized light or s-polarized light. The alignment films 22 and 32 illustrated in FIG. 3 are formed so that the polarization direction of the signal light SL and the alignment direction of the liquid crystals 11 are the same. The alignment direction is a direction in which the liquid crystals 11 in the vicinity of the alignment film 22 are inclined, for example. The direction in which the liquid crystals 11 in the vicinity of the alignment film 32 are inclined may be the alignment direction.

By making the polarization direction of the signal light SL and the alignment direction of the liquid crystal 11 the same, it is possible to suppress attenuation of the signal light SL caused by the modulation of linearly polarized light into elliptically polarized light and p-polarized light having an s-polarized light component or s-polarized light having a p-polarized light component, and the signal light SL can be efficiently reflected.

In FIG. 4, pa, pb, and pc schematically show a difference in the phase velocity caused by a difference in the refractive index of the liquid crystals 11 on the pixel electrodes 24a, 24b, and 24c. The WF illustrated in FIG. 4 schematically illustrates the wavefront of the signal light SL. The wavefront WF is a surface in which the phases of the signal light SL are aligned. The phase change amount or phase velocity or the signal light SL increases stepwise from the pixel electrode 24a toward the pixel electrode 24c. As a result, the wavefront WF of the signal light SL can be changed (inclined).

By the driving voltages DVa, DVb, and DVc, an inclination angle $\theta$ of the wavefront WF can be increased by increasing the difference in the refractive index of the liquid crystal 11 on the pixel electrodes 24a, 24b, 24c, and increasing the difference in phase change. The inclination angle θ of the wavefront WF can be reduced by reducing the difference in the refractive index of the liquid crystals 11 on the pixel electrodes 24a, 24b, 24c, and reducing the difference in the phase change. The inclination angle θ corresponds to an angle formed by the wavefront WF of the signal light SL and the perpendicular lines of the pixel electrodes 24a, 24b, and 24c. The inclination angle θ of the wavefront WF can be changed by changing the number of pixel electrodes 24.

Accordingly, the information data JD illustrated in FIG. 1 includes the parameter indicating the relationship between the positions of the input port and the output port of the signal light SL and the angle formed by incidence and reflection of the signal light SL at the pixel electrode 24, and the parameter relating to the band of wavelength of the signal light SL, that is, the distribution of the phase change amount for realizing a desired reflected light angle.

The wavefront WF of the signal light SL has a predetermined inclination angle θ based on the image data DD generated by the image data generator 2 and the signal light SL is reflected by the pixel electrodes 24a, 24b, and 24c. Accordingly, the LCOS element 5 can reflect the signal light SL in a predetermined direction by changing the phase velocity of the signal light SL stepwise for each pixel based on the image data DD.

The LCOS element 5 can control the inclination angle θ of the wavefront WF of the signal light SL according to the change of the phase velocity. That is, the LCOS element 5 functions as a phase modulation element that reflects the signal light SL in a predetermined direction by changing the phase velocity for each pixel. The LCOS element 5 controls the inclination angle θ of the wavefront WF of the signal light SL, so that the signal light SL is incident on the target output port.

Figure 6:
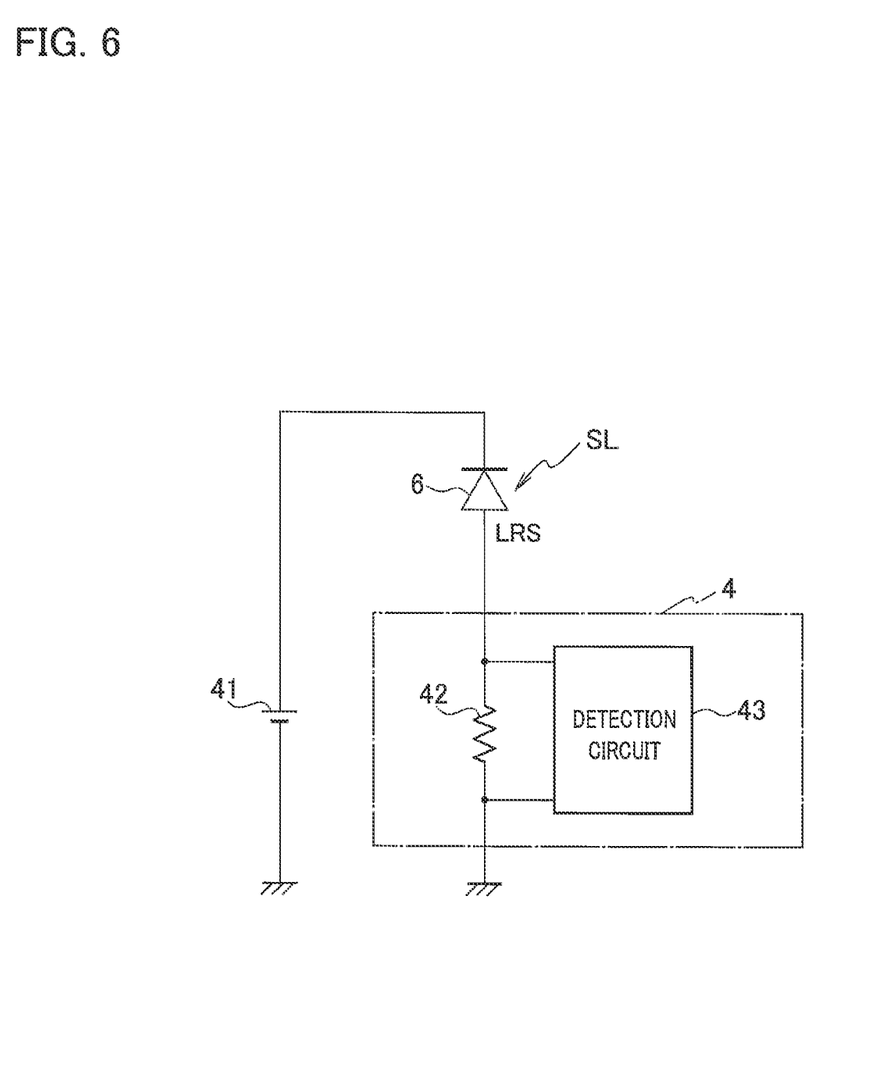
FIG. 6 is a diagram illustrating a light reception signal detector of the phase modulation device according to one or more embodiments.

A configuration example of the light reception signal detector 4 will be described with reference to FIG. 6. As illustrated in FIG. 6, the light reception signal detector 4 includes a resistor 42 and a detection circuit 43. The photodiode illustrated in FIG. 6 indicates the light receiver 6. The detection circuit 43 of the light reception signal detector 4 detects the light reception signal LRS generated by the light receiver 6. The resistor 42 may be formed on the driving substrate 20 of the LCOS element 5. A power supply 41 applies a bias voltage to the light receiver 6. Specifically, the power supply 41 is connected to a predetermined connection terminal 23 among the plurality of connection terminals 23 illustrated in FIG. 2 or 3. The power supply 41 supplies the bias voltage to the light receiver 6 via the predetermined connection terminal 23.

A control method of the LCOS element 5 (liquid crystal element) will be described with reference to a flowchart illustrated in FIG. 7. The normal operation indicated in the flowchart of FIG. 7 corresponds to the operation of the LCOS element 5 in a state in which an image pattern that repeats a refractive index distribution for each pixel block 25 based on the image data DD is displayed in the pixel region 21 of the LCOS element 5 and the pixel block 25 of the pixel region 21 is irradiated with the signal light SL.

Figure 7:
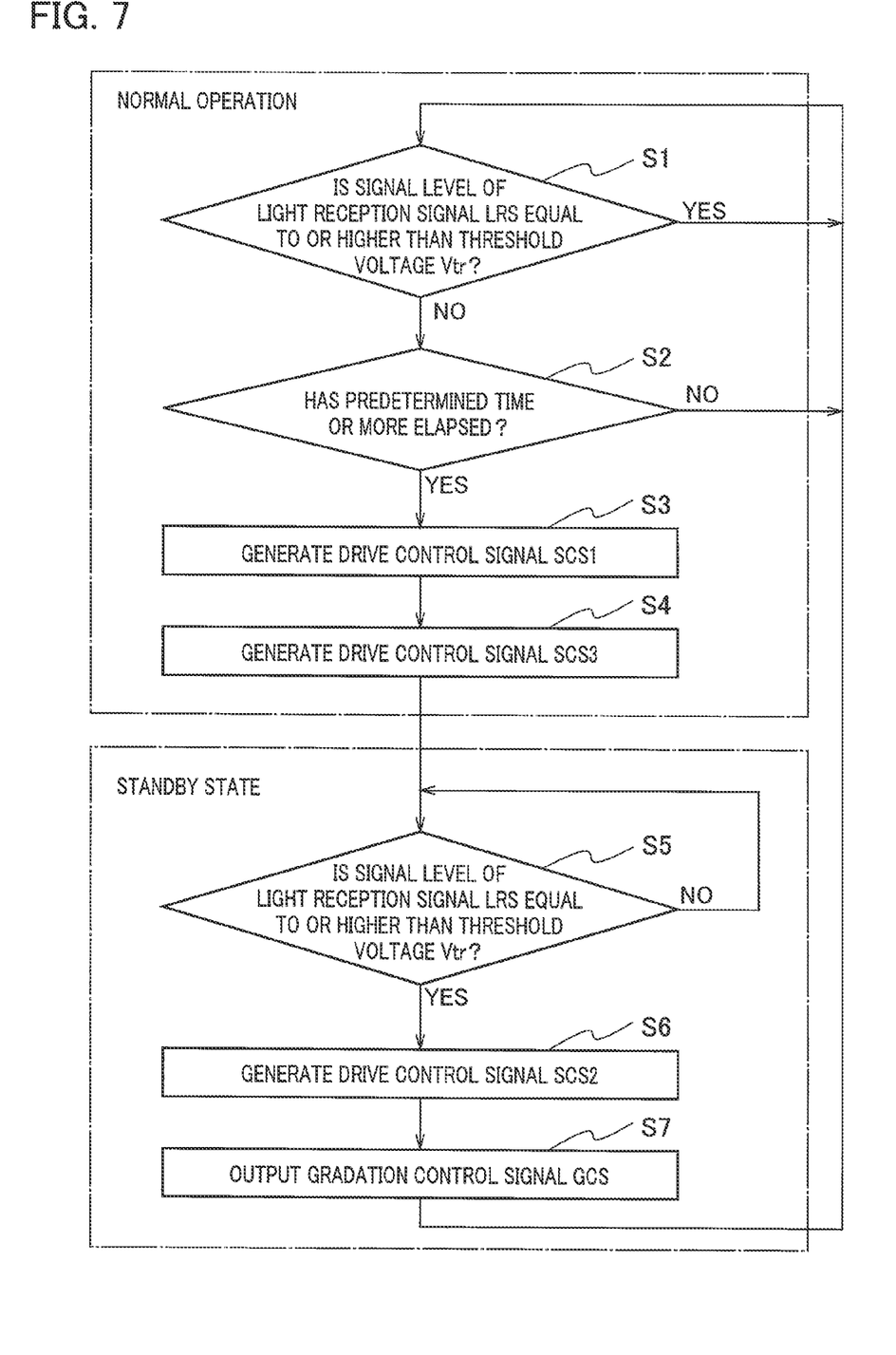
FIG. 7 is a flowchart illustrating an example of a control method of the liquid crystal element in the phase modulation device.

In the normal operation, the light reception signal detector 4 detects the light reception signal LRS, which is generated by the light receiver 6, by the detection circuit 43 in step S1 of the flowchart illustrated in FIG. 7. Furthermore, the light reception signal detector 4 determines whether or not a signal level of the light reception signal LRS is equal to or higher than a preset threshold voltage Vtr, by the detection circuit 43. When it is determined that the signal level of the light reception signal LRS is equal to or higher than the threshold voltage Vtr (YES), the phase modulation device 1 returns the process to step S1.

When it is determined that the signal level of the light reception signal LRS is not equal to or higher than the threshold voltage Vtr (NO), the light receiving signal detector 4 determines that it is in a no-signal state, by the detection circuit 43, and in step S2, determines whether or not a predetermined time or more has elapsed in the state (no signal state) where the signal level of the light reception signal LRS is not equal to or higher than the threshold voltage Vtr, by the detection circuit 43. When it is determined that the predetermined time or more has not elapsed (N), the phase modulation device 1 returns the process to step S1.

When it is determined that the predetermined time or more has elapsed (YES), in step S3, the light reception signal detector 4 generates the drive control signal SCS1 for switching the driving state of the LCOS element 5 from the normal operation to the standby state and outputs the drive control signal SCS1 to the controller 3.

In step S4, the controller 3 generates the drive control signal SCS3 for switching the driving state of the LCOS element 5 from the normal operation to the standby state based on the drive control signal SCS1, and outputs the drive control signal SCS3 to the LCOS element 5. The controller 3 switches the LCOS element 5 from the normal operation to the standby state by the drive control signal SCS3.

The controller 3 stops the driving state of the LCOS element 5, for example, by the drive control signal SCS3, and puts the LCOS element 5 in a standby state. Alternatively, the controller 3 causes an image pattern with the same gray level for the entire screen to be displayed in the pixel region 21 by the drive control signal SCS3, for example, and puts the LCOS element 5 in the standby state.

In order to minimize the power consumption of the LCOS element 5, an image pattern with the same gray level, which is minimum gray level for the entire screen, is usually displayed in the pixel region 21. However, depending on the driving method or circuit configuration of the LCOS element 5, it may be preferable to display an image pattern with the same gray level, which is an intermediate gray level for the entire screen, in the pixel region 21. Accordingly, the gray level at which power consumption of the LCOS element 5 is minimized may be set based on the experimental result. By displaying an image pattern with the same gray level, which is the gray level set on the entire screen, in the pixel region 21 and putting the LCOS element 5 in the standby state, power consumption of the LCOS element 5 in the standby state can be minimized.

The controller 3 may cause the image pattern with the same gray level, which is the gray level set for the entire screen, to be displayed in the pixel region 21 by the drive control signal SCS3, stop the driving state of the LCOS element 5 after a predetermined time has elapsed, and put the LCOS element in the standby state, for example.

Even in the standby state, a bias voltage is applied to the light receiver 6. Therefore, even in the standby, state, the light reception signal detector 4 can detect the light reception signal LRS, which is generated by the light receiver 6, by the detection circuit 43.

In the standby state, the light reception signal detector 4 detects the light reception signal LRS, which is generated by the light receiver 6, by the detection circuit 43 in step S5. Furthermore, the light reception signal detector 4 determines whether or not the signal level of the light reception signal LRS is equal to or higher than the preset threshold voltage Vtr. When it is determined that the signal level of the light reception signal LRS is not equal to or higher than the threshold voltage Vtr (NO), the light reception signal detector 4 determines that it is in the no-signal state. The phase modulation device 1 returns the process to step S5.

When it is determined that the signal level of the light reception signal LRS is equal to or higher than the threshold voltage Vtr (YES), the light reception signal detector 4 determines that it is not in the no-signal state, that is, it is in a state in which the signal light SL is incident on the pixel block 25 in the pixel region 21. Furthermore, in step S6, the light reception signal detector 4 generates the drive control signal SCS2 for switching the driving of the LCOS element 5 from the standby state to the normal operation and outputs the drive control signal SCS2 to the controller 3.

In step S7, the controller 3 outputs the gradation control signal GCS to the LCOS element 5 instead of the drive control signal SCS3, based on the drive control signal SCS2. As a result, the LCOS element 5 is switched from the standby state to the normal operation. The phase modulation device 1 returns the process to step S1.

In the liquid crystal element, the phase modulation device, and the control method of the liquid crystal element according to one or more embodiments, the light receiver 6 is formed in the liquid crystal element (LCOS element) 5. Since the light receiver 6 is formed in a region in the vicinity of the pixel region 21 of the liquid crystal element 5, the light receiver 6 can receive light (for example, signal light SL) with which the pixel region 21 is irradiated.

The light receiver 6 photoelectrically converts the irradiated light to generate the light reception signal LRS and outputs the light reception signal LRS to the light reception signal detector 4. The light reception signal detector 4 generates the drive control signal SCS1 for switching the driving state of the LCOS element 5 from the normal operation to the standby state, or the drive control signal SCS2 for switching the driving state of the LCOS element 5 from the standby state to the normal operation based on the signal level of the light reception signal LRS and its elapsed time, and outputs the drive control signal SCS1 or SCS2 to the controller 3.

The controller 3 generates the drive control signal SCS3 for switching the driving state of the LCOS element 5 from the normal operation to the standby state based on the drive control signal SCS1, and outputs the drive control signal SCS3 to the LCOS element 5. The controller 3 switches the LCOS element 5 from the normal operation to the standby state by the drive control signal SCS3.

The controller 3 outputs the gradation control signal GCS instead of the drive control signal SCS3 to the LCOS element 5, based on the drive control signal SCS2. As a result, the LCOS element 5 is switched from the standby state to the normal operation.

Accordingly, in accordance with the liquid crystal element, the phase modulation device, and the control method of the liquid crystal element according to one or more embodiments, it is possible to accurately detect that it is in a no-signal state and suppress an increase in power consumption of the liquid crystal element.

The present invention is not limited to one or more embodiments described above, and various modifications may be made thereto without departing from the scope of the present invention.

The disclosure of the present application is related to the subject matter described in Japanese Patent Application No. 2018-043899 filed on Mar. 12, 2018, the disclosure content of which is incorporated herein by reference in its entirety.

What is claimed is:

1. A control method of a liquid crystal element, the method comprising:
   generating a light reception signal by photoelectrically converting light with which a pixel region, in which a plurality of pixel electrodes are arranged, one pixel electrode constitutes one pixel, and different driving voltages are applied to the plurality of pixel electrodes based on a gradation control signal including gradation data corresponding to each pixel, is irradiated;
   determining whether or not a signal level of the light reception signal is equal to or higher than a threshold voltage;
   in the case of the signal level of the light reception signal is determined as equal to or higher than the threshold voltage, determining whether or not a predetermined time or more has elapsed in the state that is not equal to or higher than the threshold voltage; and
   in the case of the predetermined time or more being elapsed, switching a driving state of the liquid crystal element from normal operation to a standby state.

* * * * *